(12) United States Patent
Grossinger et al.

(10) Patent No.: US 9,972,136 B2
(45) Date of Patent: *May 15, 2018

(54) METHOD, SYSTEM AND DEVICE FOR NAVIGATING IN A VIRTUAL REALITY ENVIRONMENT

(71) Applicant: Facebook, Inc., Menlo Park, CA (US)

(72) Inventors: Nadav Grossinger, Foster City, CA (US); Emil Alon, Pardes Hana (IL); Iddo Bar David, Haifa (IL); Efrat Solodnik, Tel Aviv (IL)

(73) Assignee: Facebook, Inc., Menlo Park, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/433,952

(22) Filed: Feb. 15, 2017

(65) Prior Publication Data

US 2017/0169618 A1 Jun. 15, 2017

Related U.S. Application Data

(63) Continuation of application No. 14/975,486, filed on Dec. 18, 2015, now Pat. No. 9,659,413.

(Continued)

(51) Int. Cl.
*G06T 15/00* (2011.01)
*G06T 19/00* (2011.01)
(Continued)

(52) U.S. Cl.
CPC ............ *G06T 19/006* (2013.01); *G06F 3/011* (2013.01); *G06F 3/012* (2013.01); *G06F 3/017* (2013.01);
(Continued)

(58) Field of Classification Search
CPC .......... G06F 3/011; G06F 3/012; G06F 3/017; G06F 3/04815; G06T 19/006; G06T 19/003
(Continued)

(56) References Cited

U.S. PATENT DOCUMENTS 8,488,246 B2 7/2013 Border et al.
8,633,890 B2 * 1/2014 Tossell .................... G06F 3/017
345/156

(Continued)

FOREIGN PATENT DOCUMENTS

JP H11-305907 A 11/1999
JP 2013-521576 A 6/2013
(Continued)

OTHER PUBLICATIONS

Khan, Rafiqul Zaman, and Noor Adnan Ibraheem. "Hand gesture recognition: a literature review." International journal of artificial Intelligence & Applications 3.4 (2012): 161.*

(Continued)

*Primary Examiner* — Phu K Nguyen
(74) *Attorney, Agent, or Firm* — Fenwick & West LLP (57) ABSTRACT

A method, a system, and a device for navigating in a virtual reality scene, using body parts gesturing and posturing are provided herein. The method may include: projecting a synthetic 3D scene, into both eyes of a user, via a near eye display, so as to provide a virtual reality view to the user; identifying at least one gesture or posture carried out by at least one body part of said user; measuring at least one metric of a vector associated with the detected gesture or posture; applying a movement or action of said user in virtual reality environment, based on the measured metrics;

(Continued)

and modifying the virtual reality view so as to reflect the movement or action of said user in the virtual reality environment.

20 Claims, 11 Drawing Sheets

Related U.S. Application Data (60) Provisional application No. 62/093,493, filed on Dec. 18, 2014.

(51) Int. Cl.
*G06F 3/01* (2006.01)
*G06F 3/0481* (2013.01)

(52) U.S. Cl.
CPC ........ *G06F 3/04815* (2013.01); *G06T 19/003* (2013.01)

(58) Field of Classification Search
USPC ........................................................ 345/419
See application file for complete search history.

(56) References Cited

U.S. PATENT DOCUMENTS

| | | | |
|---|---|---|---|
| 8,657,683 B2 | 2/2014 | Langridge et al. | |
| 8,824,781 B2* | 9/2014 | Litvak | G06K 9/00201 |
| | | | 382/154 |
| 9,002,099 B2* | 4/2015 | Litvak | G06K 9/00382 |
| | | | 345/653 |
| 9,134,534 B2 | 9/2015 | Border et al. | |
| 9,285,872 B1 | 3/2016 | Raffle et al. | |
| 9,366,862 B2 | 6/2016 | Haddick et al. | |
| 9,588,593 B2* | 3/2017 | Li | G06F 3/017 |
| 9,659,413 B2* | 5/2017 | Grossinger | G06F 3/011 |
| 2002/0075286 A1 | 6/2002 | Yonezawa et al. | |
| 2011/0221656 A1 | 9/2011 | Haddick et al. | |
| 2012/0212400 A1 | 8/2012 | Border et al. | |
| 2012/0309535 A1 | 12/2012 | Langridge et al. | |
| 2012/0320080 A1 | 12/2012 | Giese et al. | |
| 2013/0137076 A1 | 5/2013 | Perez et al. | |
| 2014/0282275 A1 | 9/2014 | Everitt et al. | |

FOREIGN PATENT DOCUMENTS

| | | |
|---|---|---|
| JP | 2014-093703 A | 5/2014 |
| JP | 2014-149856 A | 8/2014 |
| JP | 2014-235634 A | 12/2014 |
| JP | 2016-515268 A | 5/2016 |
| KR | 10-2013-0111248 A | 10/2013 |
| WO | WO 2014/033306 A1 | 3/2014 |

OTHER PUBLICATIONS

PCT International Search Report and Written Opinion, PCT Application No. PCT/US2015/066907, dated Apr. 1, 2016, 11 pages.
United States Office Action, U.S. Appl. No. 14/975,486, dated Oct. 24, 2016, eight pages.
Korea Intellectual Property Office, Office Action, Korean Patent Application No. 10-2017-7017683, dated Aug. 22, 2017, twelve pages.
Japan Patent Office, Office Action, Japanese Patent Application No. 2017-532919, dated Dec. 5, 2017, eleven pages.
Korea Intellectual Property Office, Office Action, Korean Patent Application No. 10-2017-7017683, dated Dec. 27, 2017, seven pages.
Korean Intellectual Property Office, Office Action, Korean Patent Application No. 10-2017-7017683, Feb. 26, 2018, eleven pages.

* cited by examiner

METHOD, SYSTEM AND DEVICE FOR NAVIGATING IN A VIRTUAL REALITY ENVIRONMENT

CROSS-REFERENCE TO RELATED APPLICATIONS

This application is a continuation of U.S. application Ser. No. 14/975,486, filed Dec. 18, 2015, which claims the benefit of U.S. Provisional Application No. 62/093,493, filed Dec. 18, 2014, all of which are incorporated by reference in their entirety.

TECHNICAL FIELD

The present invention relates generally to virtual reality (VR) environment and more particularly, to a method, system, and device for navigating in a VR environment.

BACKGROUND OF THE INVENTION

Prior to the background of the invention being set forth, it may be helpful to set forth definitions of certain terms that will be used hereinafter.

The term 'Virtual Reality' (VR) as used herein is defined as a computer-simulated environment that can simulate physical presence in places in the real world or imagined worlds. Virtual reality could recreate sensory experiences, including virtual taste, sight, smell, sound, touch, and the like. Many traditional VR systems use a near eye display for presenting a 3D virtual environment.

The term 'Augmented Reality' (AR) as used herein is defined as a live direct or indirect view of a physical, real-world environment whose elements are augmented (or supplemented) by computer-generated sensory input such as sound, video, graphics or GPS data. It is related to a more general concept called mediated reality, in which a view of reality is modified (possibly even diminished rather than augmented), by a computer.

The term 'near eye display' as used herein is defined as a device which includes wearable projected displays, usually stereoscopic in the sense that each eye is presented with a slightly different field of view so as to create the 3D perception.

The term 'virtual reality headset' sometimes called 'goggles', is a wrap-around visual interface to display computer output. Commonly the computer display information is presented as a three-dimensional representation of real-world environments. The goggles may or may not include optics beyond the mere structure for holding the computer display (possibly in a form of a smartphone).

The term 'Virtual Reality navigation' as used herein is defined as moving throughout the virtual environment which results in a respective change of the scene projected onto the eyes of the user. It should be noted that VR systems do not usually maintain a one-to-one ratio between real-world movement and virtual-world movement (e.g., a step forward in the real world does not necessarily mean a step forward in the virtual world). Consequently, input devices of all types are used in order to allow VR navigation by the user.

Figure 1:
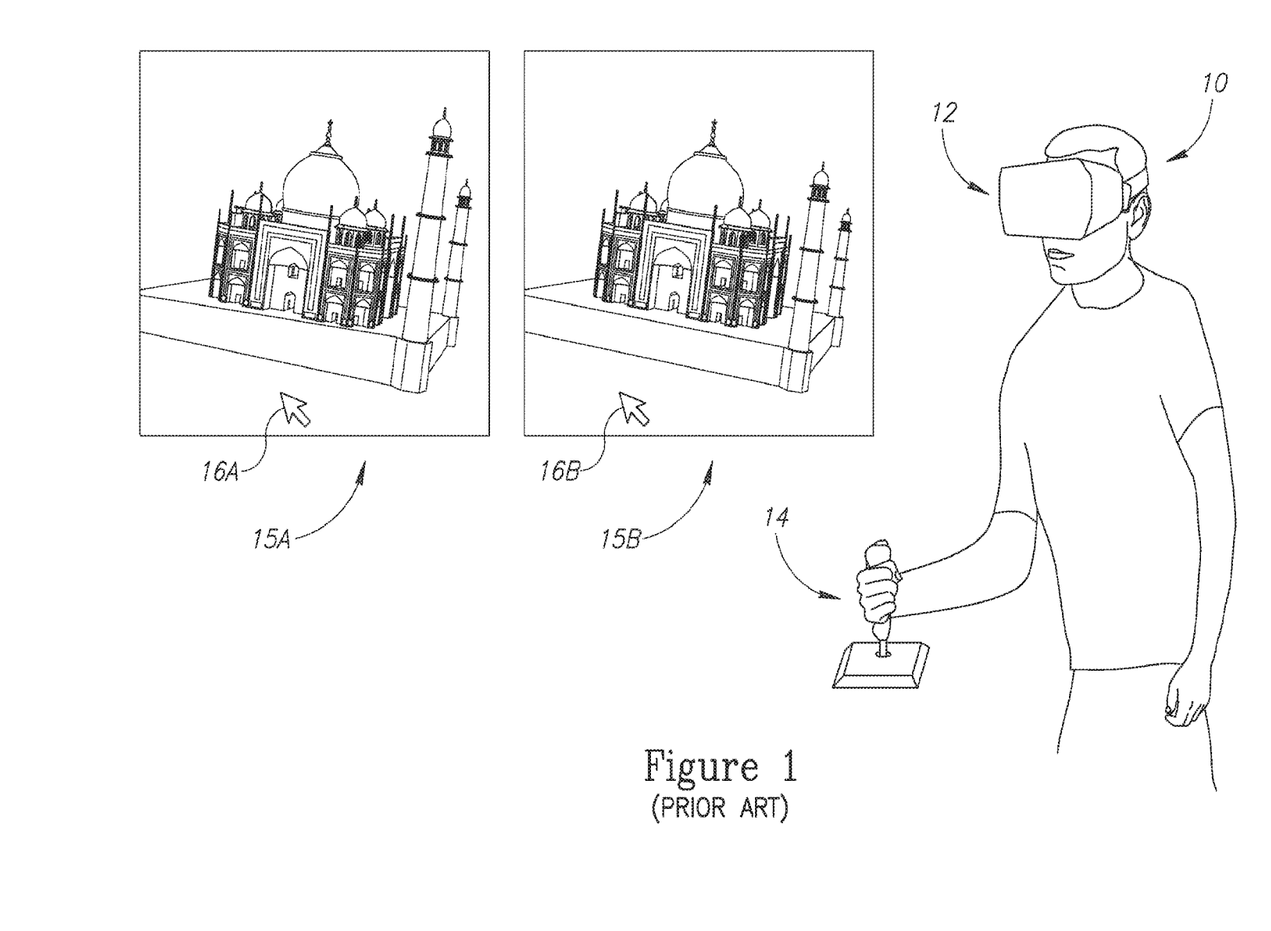
FIG. 1 is a schematic diagram illustrating a virtual reality system according to the prior art.

FIG. 1 shows a traditional virtual reality (VR) system in which user 10 wears a head mounted stereoscopic display 12 (e.g., Oculus Rift™) which projects a synthetic image 15A and 15B of a scene (e.g., the Taj Mahal) onto each eye of user 10. Each eye receives the synthetic scene at a slightly different angle so as to create a 3D perception in the brain of the user. Additionally, head mounted display 12 may be provided with sensors such as accelerometers or gyros (not shown) that may detect in real time the viewing angle or gaze direction of the user. As a result, the VR system may adjust images 15A and 15B to fit the new head orientation of the user. As this adjustment is carried out in real time, an illusion of the virtual reality imitating the head movements in the real world may be achieved.

Beyond tracking the view point of the user as explained above, VR systems provide a further interaction with the virtual world via input devices such as joystick 14 (or mouse, touchpad, or even a keyboard). Such an input device may enable user 10 to perform VR navigation using visual indicators. For example, the user may be presented with a visual indicator which he or she can move, for example a cursor 16A, 16B indicated on stereoscopic images 15A and 15B over the VR scene. Then, responsive to a further action by user 10 such as pulling a trigger on joystick 14, the user advances in the virtual towards the location he or she pointed by the cursor. As user 10 is confined to moving one or two steps in the real world, in the virtual world he or she can move around and walk long distances. Input devices as explained above are currently being used in order to address the navigation problem in the virtual world. Naturally, the use of such traditional input devices undermines the overall user VR experience.

SUMMARY OF THE INVENTION

According to one embodiment of the present invention, a system which serves as an input device for navigating in a virtual reality scene, using postures and/or gestures is provided herein. The system may include: a near eye display configured to project a synthetic 3D scene, into both eyes of a user, to generate a virtual realty environment; a gesture-posture capturing device configured to derive gestures of at least one body part of said user; and a computer processor configured to translate the derived gestures of said body part into a movement or action of said user in said synthetic 3D scene and modify the viewpoint of the user of the virtual reality environment, based on the translated movement or action.

According to another embodiment of the present invention, a method for navigating in a virtual reality scene, using postures and gestures is provided herein. The method may include the following steps: projecting a synthetic 3D scene, into both eyes of a user, via a near eye display, so as to provide a virtual reality view to the user; identifying at least one gesture or posture carried out by at least one body part of said user; measuring at least one metric of a vector associated with the detected gesture or posture; applying a movement or action of said user in virtual reality environment, based on the measured metrics; and modifying the virtual reality view so as to reflect the movement or action of said user in the virtual reality environment.

These, additional, and/or other aspects and/or advantages of the embodiments of the present invention are set forth in the detailed description which follows; possibly inferable from the detailed description; and/or learnable by practice of the embodiments of the present invention.

DETAILED DESCRIPTION OF THE INVENTION

With specific reference now to the drawings in detail, it is stressed that the particulars shown are by way of example and for purposes of illustrative discussion of the preferred embodiments of the present technique only, and are presented in the cause of providing what is believed to be the most useful and readily understood description of the principles and conceptual aspects of the present technique. In this regard, no attempt is made to show structural details of the present technique in more detail than is necessary for a fundamental understanding of the present technique, the description taken with the drawings making apparent to those skilled in the art how the several forms of the invention may be embodied in practice.

Before at least one embodiment of the present technique is explained in detail, it is to be understood that the invention is not limited in its application to the details of construction and the arrangement of the components set forth in the following description or illustrated in the drawings. The present technique is applicable to other embodiments or of being practiced or carried out in various ways. Also, it is to be understood that the phraseology and terminology employed herein is for the purpose of description and should not be regarded as limiting.

Some embodiments of the present invention provide a method, system, and a device for navigating in a virtual reality environment by carrying out various bodily postures and/or gestures that are intuitive to the user. More specifically, a user may move his or her body or body parts in a manner that is being translated in real time by embodiments of the present invention to a predefined navigation command. Thus, certain postures and/or gestures in the real world cause a corresponding movement in the virtual reality world.

Some embodiments of the present invention first detect the predefine posture or gesture applied by the user and then goes on the measure quantitative metric associated with the gesture or the posture. These metrics may relate to a vector that is associated with the posture or gesture and may include its length and spatial angles. In some embodiments, the metrics of the vector are translated to quantitative navigation commands in the virtual reality world usually in a continuous manner. Thus, the navigation command in the virtual reality does not change unless a predefined terminating act has been performed by the user. Such a terminating act may include resuming a basic posture or some kind of hand maneuver.

Figure 2:
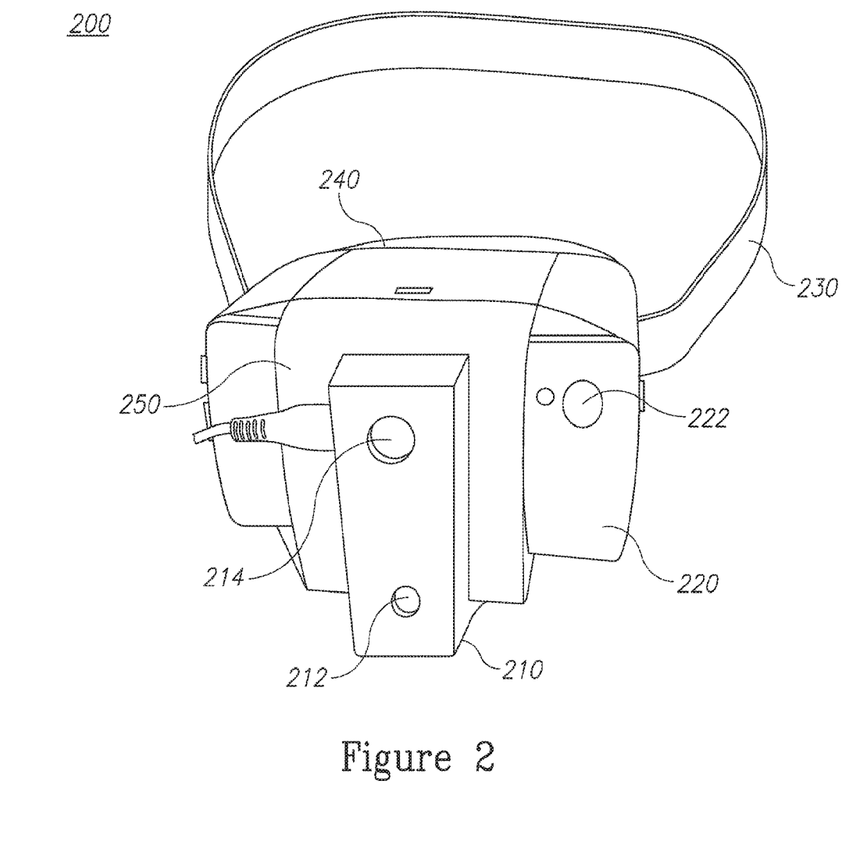
FIG. 2 is schematic diagram illustrating a virtual reality system according to some embodiments of the present invention.

FIG. 2 is a perspective view of a device 210 in accordance with some embodiments of the present invention packed and attached to its immediate environment 200 being a virtual reality (VR) headset 240 (goggles) configured for use with a mobile device such as smartphone 220. Device 210 may include an illuminator (e.g. laser transmitter) such as an infra-red (IR) pattern illuminator 212, a camera such as an IR camera 214. Device 210 may further include a pre-processor (not shown) configured to carry out initial image processing. Device 210 is further configured to physically and electronically interface with both Smartphone 220, and the near eye display 240 that form together the VR headset. Such a VR headset (goggles) may be arranged for use with smartphones, as is known in the art, and usually includes a optics which can transmit the display of the smartphone (not shown—facing opposite side), a sleeve 250 for accommodating smartphone 220 which may be include a camera 222, and a strap 230 for fastening the VR headset (goggles) onto the head of the user. It is understood, however, that device 210 may interface with near eye displays such as Google Glass™ and Oculus Rift™.

In operation, device 210 may serve as a means for providing VR navigation commands using intuitive posturing and gesturing of one or more body parts of the user as will be detailed hereinafter.

Figure 3A:
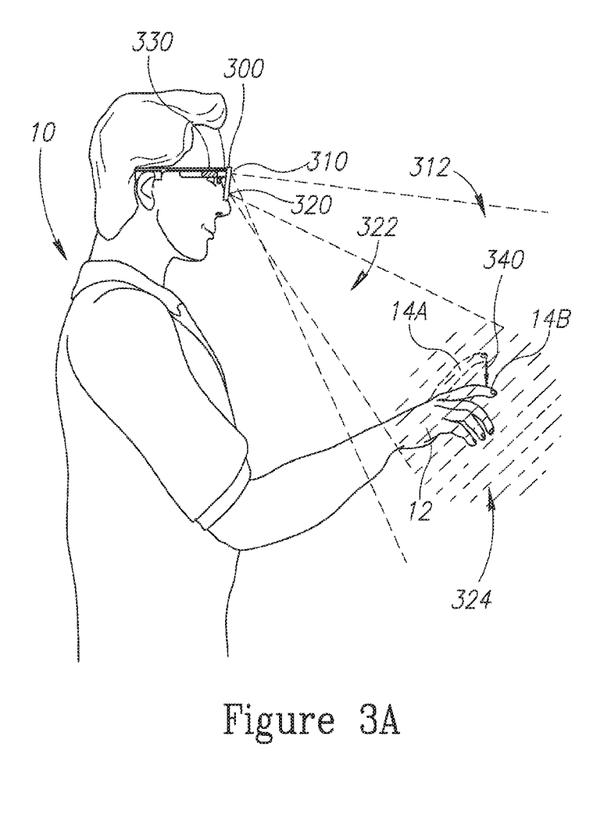
FIGS. 3A-3C are diagrams illustrating aspects of a virtual reality system according to some embodiments of the present invention.
Figure 3B:
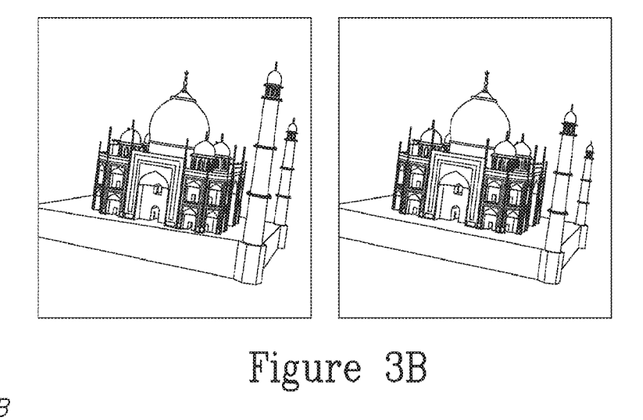
Figure 3C:
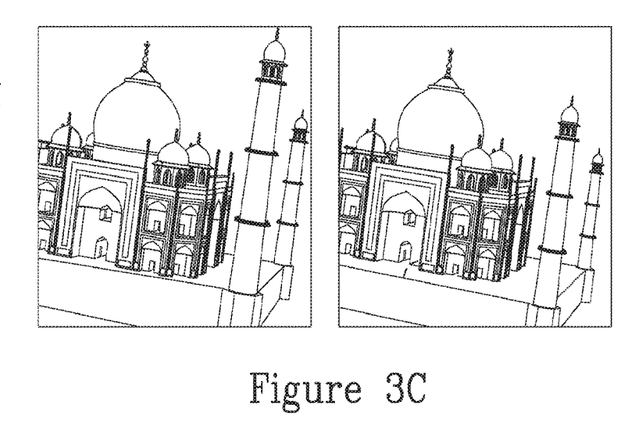

FIGS. 3A-3C are diagrams illustrating aspects of a virtual reality system according to some embodiments of the present invention. FIG. 3A is a schematic diagram illustrating a VR navigation device 300 in operation according to one embodiment of the present invention. User 10 wears a near eye display 330 on which VR navigation device 300 may be mounted possibly but not exclusively as an add-on as explained above. VR navigation device 300 may include an illuminator (e.g., laser transmitter) 320 having a field of view (FOV) 322 and a capturing unit (e.g., camera) 310 having a FOV 312. Advantageously, both FOVs are large enough to include the immediate surroundings of the user. For practical purposes it is important for the FOVs to cover any movement of both hands, including extending both hands wide open to both sides of the body. Therefore, a 'landscape' orientation of both illuminator and camera are beneficial although a 'portrait' orientation is also possible. A non-limiting configuration can include a 55° horizontal FOV and 43° vertical FOV for 'landscape' orientation and 55° vertical FOV and 43° horizontal FOV for 'portrait' orientation.

In operation, near eye display 330 may be configured, possibly via an external computer processor such as of a mobile device (not shown) to project a synthetic scene onto both eyes of user 10. Illuminator 320 may illuminate a vicinity of user 10 and/or user 10 with patterned light 324. Reflections of the patterned light may be captured by the capturing unit 310 and then analyzed by a computer processor (not shown here). The computer processor may derive the type of posture or gesture that is being carried out by user 10. Here, an erected pointing finger 14 of hand 12 of user 10 is being lowered from position 14A to position 14B along vector 340. Once the lowering of the pointing finger is being detected as such, metrics associated with vector 340 are being further analyzed in order to translate the metrics of the vector (in the real world) such as direction and displacement, into corresponding navigation movements (in the virtual world). FIG. 3B illustrates what user 10 views when his pointing finger is at position 14A while FIG. 3B illustrates advancement forward in the virtual world as the pointing finger of user 10 has moved to position 14B.

Figure 4:
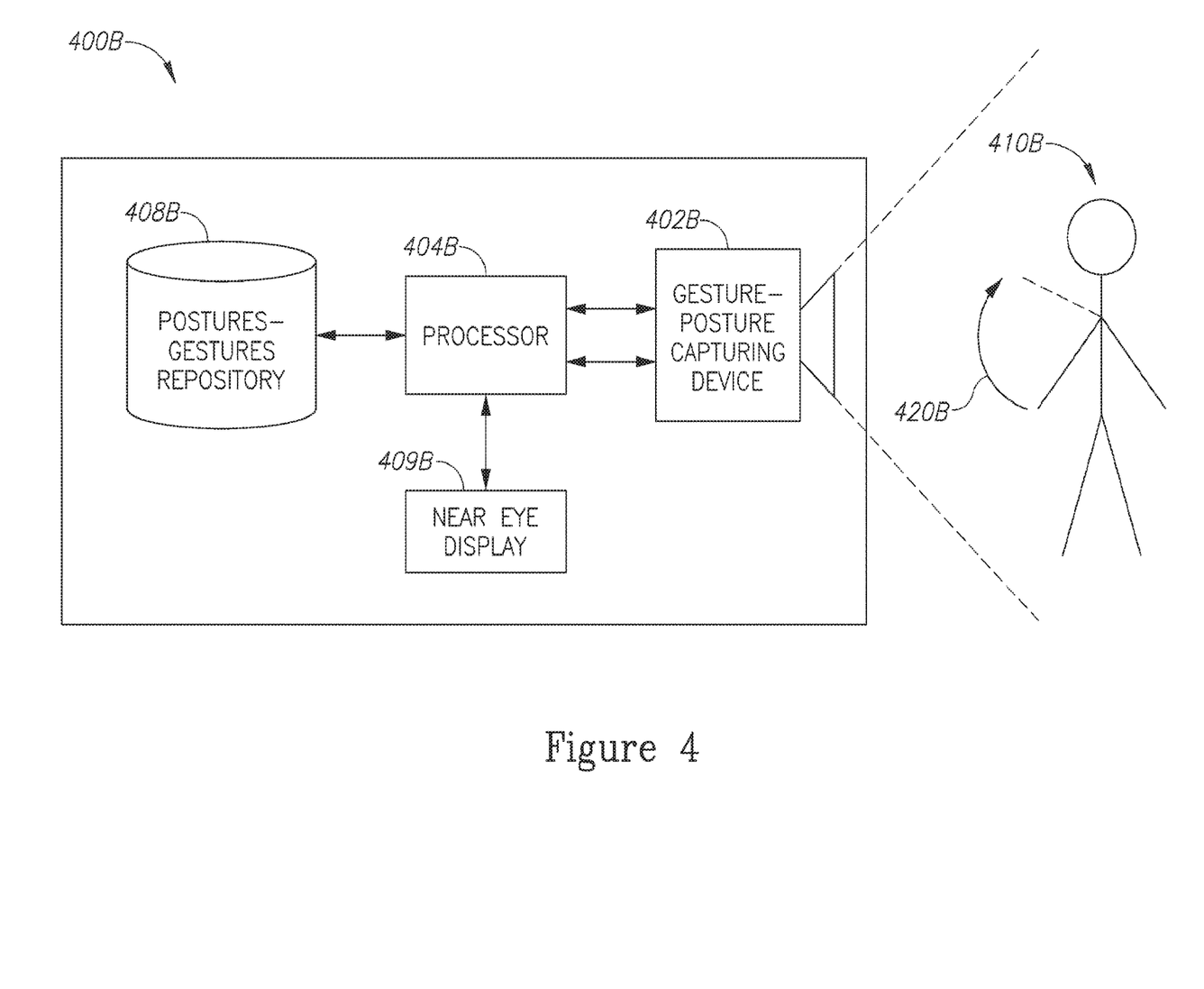
FIG. 4 is a block diagram illustrating a possible architecture in accordance with the virtual reality system of embodiments of the present invention.

FIG. 4 is block diagram illustrating a VR system 400B according to some embodiments of the present invention. System 400B may include or may be in operative association with a gesture-posture capturing device 402B which may be configured to capture various changes over time in the position and orientation of various bodily parts of a user or user-held objects. The position and orientation in denoted herein as 'posture' while the change over time of the postures is denoted herein as 'gesture'.

In one non-limiting example, gesture-posture capturing device 402B may be based on one or more visible light cameras that capture a stereoscopic view of the scene. The video images are then being processed using various image processing algorithms executed by processor 404B for deriving the movement of the user. Another possible implementation is the use of patterned light as described above where reflections coming back from the scene are being analyzed for generating a depth map from which postures and/or gestured are being deduced.

Processor 404B may be configured to receive raw data from gesture-posture capturing device 402B (such as multiple video images or pattered reflections, depending on the technology) and using classifying algorithms executed thereon, to identify the posture or the gesture, based on predefined criteria (or database). Once the specific posture or gesture is identified, postures-gestures repository 408B may be used in order to determine which form of VR movement or VR navigation activity is associated with the detected posture or gesture.

Thus, based on a dictionary stored at postures-gestures repository 408B, processor 404B may instruct near-eye display 409B to adjust the viewing point of the VR scene, as presented to the user, to comply with the corresponding VR navigation activity. For example, user 410B may wave his or her hand in a gesture 420B that may be interpreted by processor 404B and repository 408B as 'move forward' in the VR scene. As a result, processor 404B may instruct near-eye display 409B to advance forward the viewing point of user 410B as viewed by near eye display 409B. As will be explained and illustrated below in detail, waving the hand 420B can be replaced with any other manipulation that imitates moving forward in the VR world (e.g., swimming movements). It also should be noted that not only gestures may be used to invoke VR navigation activity but also static predefined postures may do so. For example, the waving of the hand of user 410B ends when his or her hand is inclined upwards at a specific angle. This posture may be interpreted—if so predefined—as a navigation activity command denoting 'go forward' and as long as the hand is inclined at approximately the specific angle, the user will keep moving forward in the VR world. As discussed above, in at least some embodiments, gesture-posture capturing device 402B is external to system 400B and can provide the raw data relating to the position and orientation, from a remote location.

Figure 5:
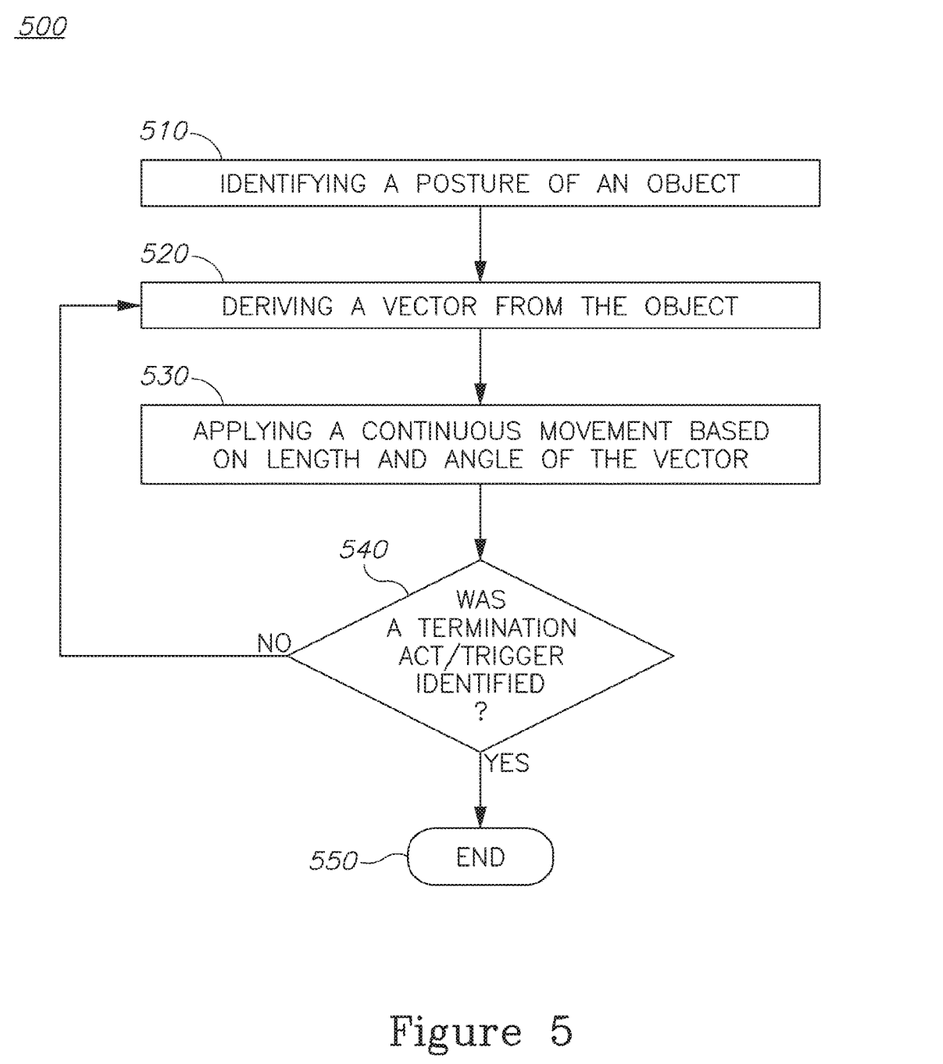
FIG. 5 is flowchart diagram illustrating a method in accordance with embodiments of the present invention.

FIG. 5 is flowchart diagram illustrating a method 500 in accordance with some embodiments of the present invention. The process starts off with identifying a posture of an object 510. Then, once the posture is detected—a vector is derived from the object so that the vector spatially represents the detected posture. Transferring the vector into a navigation movement in the virtual reality, a continuous movement which is based on the length and the angle of the vector is applied in the virtual world 530. The method then checks repeatedly whether a termination act or trigger has been identified 540. In case a termination act has been identified, the movement in the virtual world ends 550. In case a termination act has not been identified, the continuous movement is being applied repeatedly 530 until such a termination act is being identified. It is noted that the above description is also applicable to gestures and not only postures. Applying it to postures is unique in the sense that even static postures may invoke movements in the virtual world.

Figure 6A:
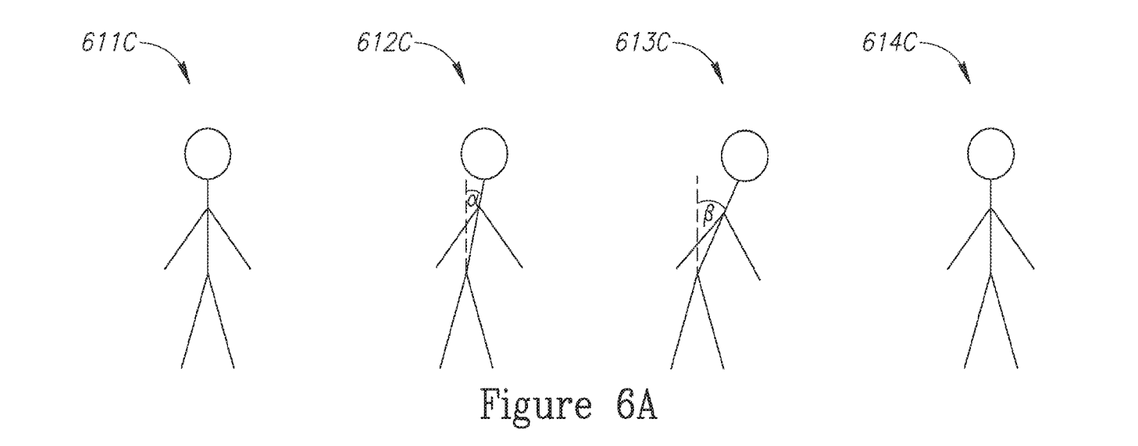
FIGS. 6A and 6B are diagrams illustrating more aspects according to some embodiments of the present invention.

FIG. 6A is a diagram illustrating an aspect relating to postures in accordance with the VR system of embodiments of the present invention. A series of torso inclinations is depicted. Posture 611C is the base posture from which all other gestures or postures are derived. In posture 612C the user leans forward, an action in the real world which may be interpreted as a VR navigation command in the VR navigation domain. As noted above, it can be either the shift from 611C to 612C (e.g., gesture) or merely the static occurrence of 612C (e.g., posture) defining an angle $\alpha$ that invokes the predefined VR navigation activity.

Similarly, a further lean forward in posture 613C may act as an accelerator of the already operative VR navigation activity so that the movement will go faster as the angle here is .beta. being greater than angle $\alpha$. Going back to the base posture 614C may be regarded as a termination act and will usually eliminate the VR navigation activity, based on the context, or at least reduce its impact.

Figure 6B:
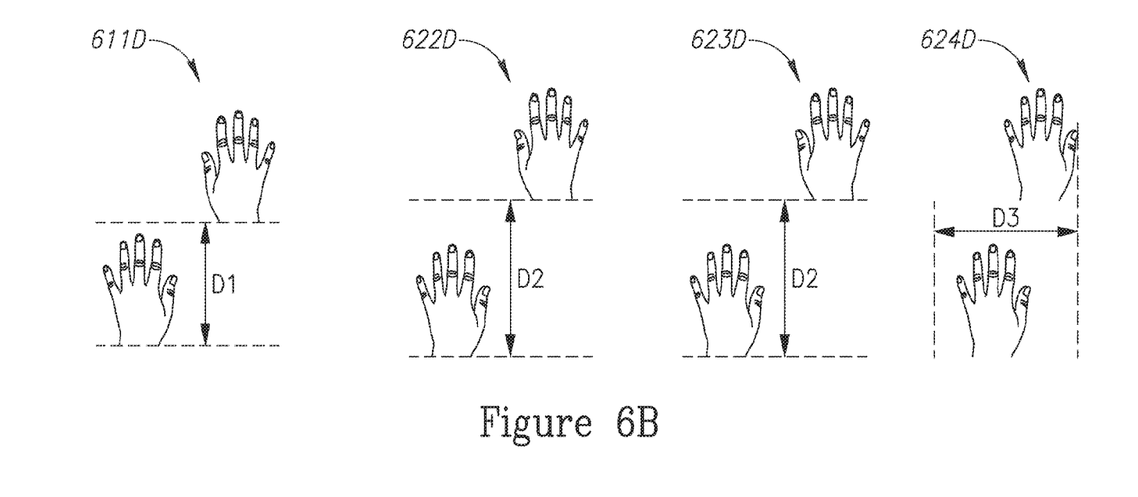

FIG. 6B is diagram illustrating another aspect relating to postures in accordance with the VR system embodiments of the present invention. Here, the base posture is the two palms of hands 621D positioned at a specific distance D1 apart from each other. Once the posture type is being identified (e.g., two palms extended side by side), a VR navigation activity may be invoked in accordance with the measured value of that distance, which in posture 622D becomes D2. As noted above, either the absolute value of D2 or alternatively the difference between D1 and D2 may serve as the metric that corresponds with the VR navigation activity, as predefined by the repository.

In posture 623D the distance between the hands D2 remains the same and so, in accordance with some embodiments, this may be interpreted as an ongoing navigation command although the hands are static and do not move at all. In posture 624D, the horizontal distance between the hands D3 is being used as the metric that is being translated to a VR navigation activity. It is understood that ratios, distances, and angles between two or more body parts can all be used as metrics that arc interpreted as corresponding VR navigation commands or activities.

Figure 7:
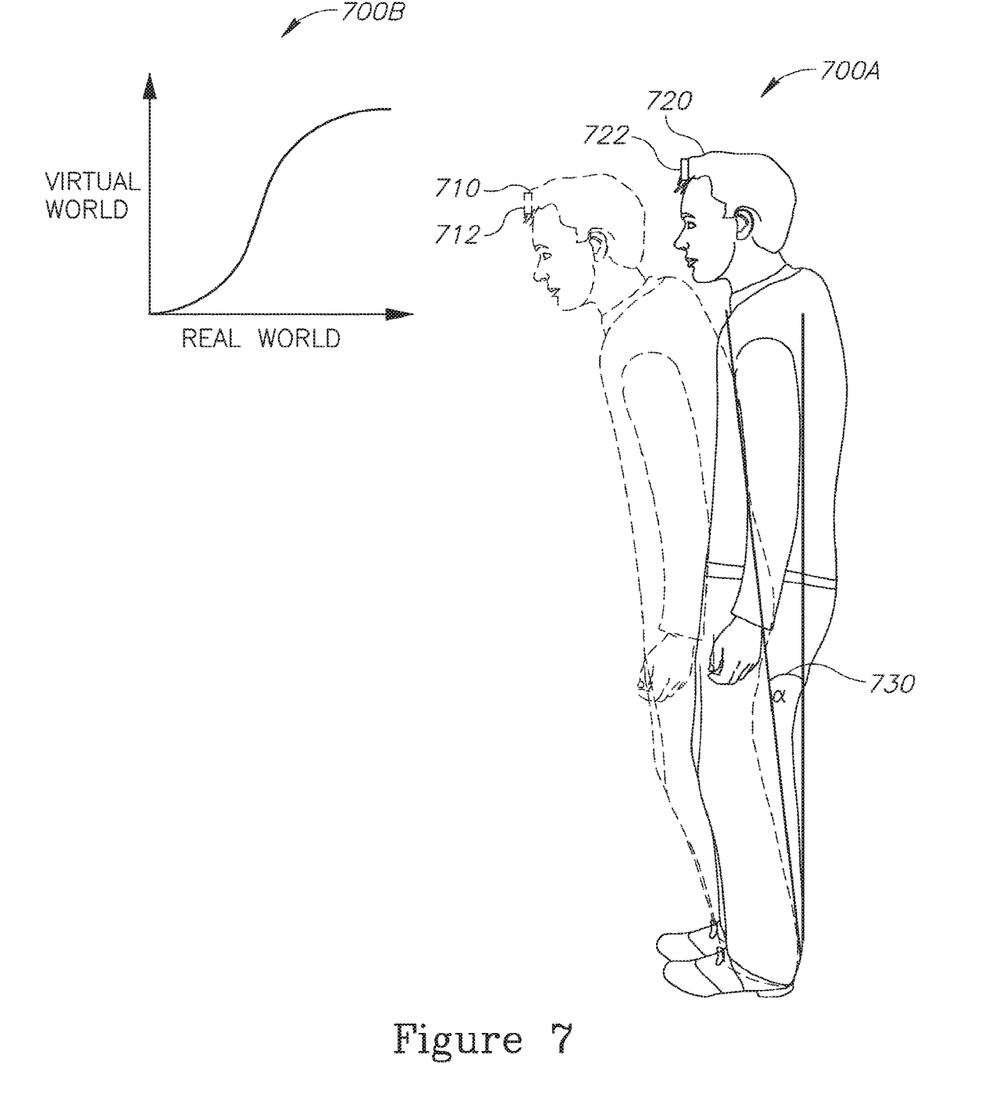
FIG. 7 is a schematic diagram illustrating another aspect of some embodiments of the present invention.

FIG. 7 illustrates yet another manner by which user 700A may invoke a movement or displacement in the virtual world. User 700A may tilt his body forward from position 720 to position 710 thereby defining a lean-forward angle $\alpha$. The leaning forward movement in real world may be translated to a forward advancement movement in the virtual world possibly in a manner which is similar to controlling a Segway™.

Specifically, as long as the torso of user 700A defines a non-zero angle $\alpha$ between position 710 and base position 720, the forward advance movement in the virtual world continues. The value of angle $\alpha$ may affect the speed of advancement. As graph 700B illustrates that the movement in the real world and the corresponding virtual world movement do not exhibit a linear relationship. Rather, as graph 700B illustrates, minor inclination of the torso does not affect the virtual world and only beyond a predefined angle α, the movement in the virtual world begins. Then, once movement in the virtual world begins, minor inclinations are sufficient to advance in the virtual world. Beyond a specific angle the sensitivity to torso inclinations is again being reduced so that an upper bound for forward speed is effectively imposed.

In some embodiments, the inclination of the torso of the user is detected by analyzing a difference in a depth map generated by the device in position 722 and the depth map as generated by the device at position 712. Specifically, as the view point in the real world changes during the move from position 720 to position 722 so does the depth map generated by the device. Analyzing the change in the depth map may be used to deduce the torso inclination in an indirect manner. It is understood that such a gesture may sometimes need a remote-external camera (not shown here) looking at the user.

Figure 8A:
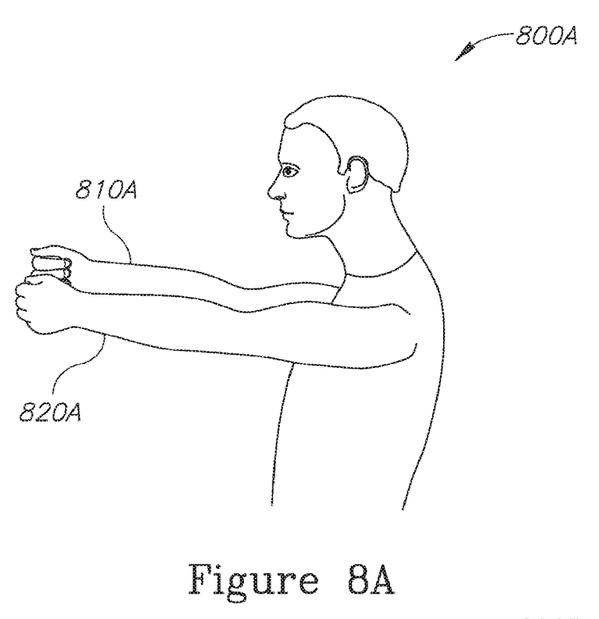
FIGS. 8A and 8B are diagrams illustrating yet another aspect of some embodiments of the present invention.
Figure 8B:
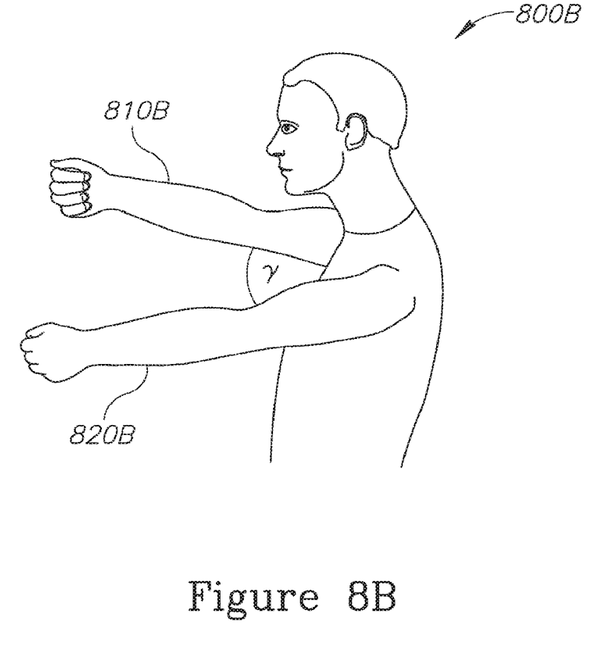

FIGS. 8A and 8B are diagrams illustrating yet another aspect of some embodiments of the present invention. FIG. 8A shows a user in position 800A with two hands 810A and 820A extended forward and adjacent to each other. FIG. 8B shows a user in position 800B with two hands 810B and 820B defining an angle γ between them. Once the type of posture of two hands extended forward is identified, the corresponding metric of the angle γ can be measured and be used as guidance for the navigation command in the virtual world.

Figure 9:
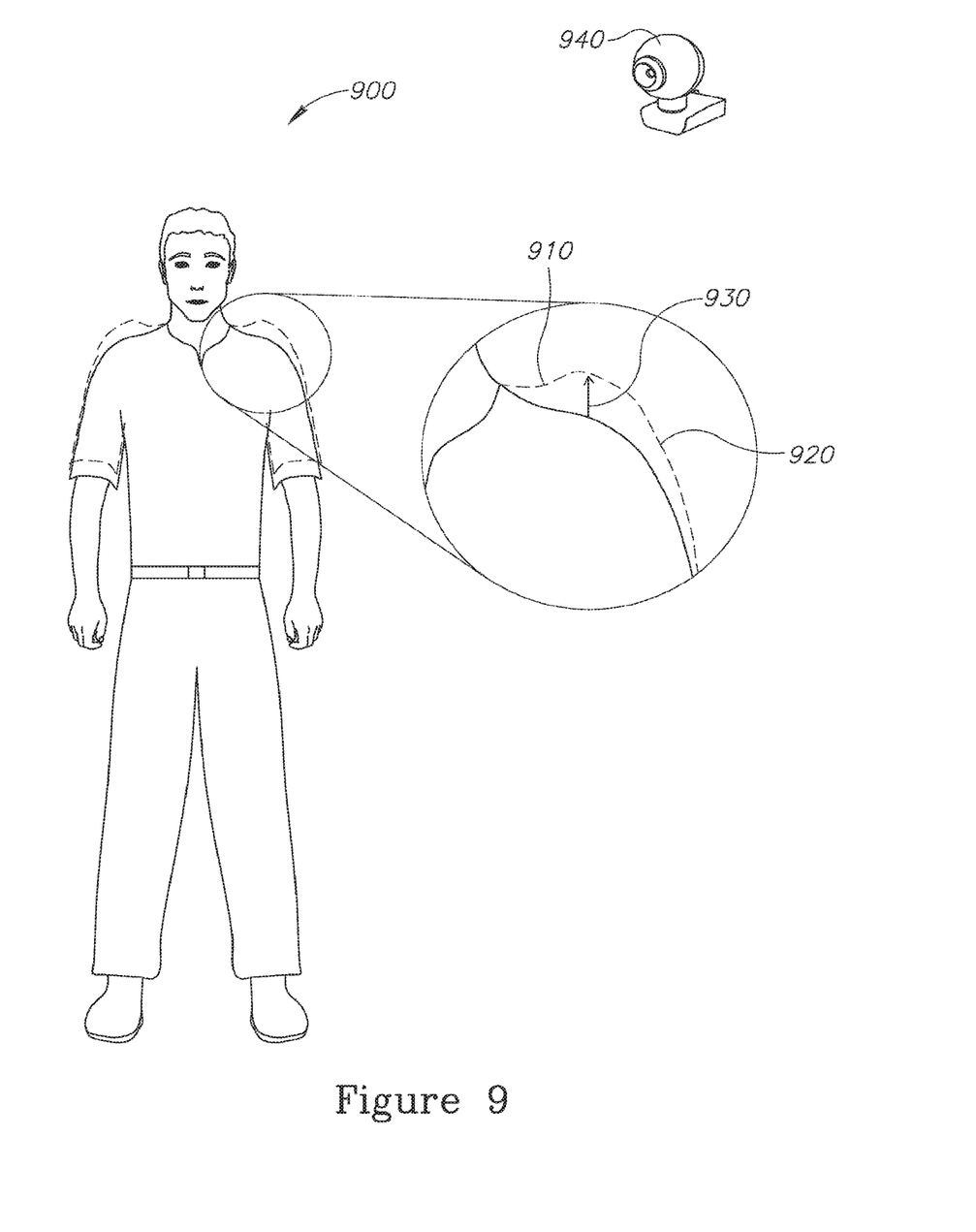
FIG. 9 is a diagram illustrating yet another aspect of some embodiments of the present invention.

FIG. 9 is a diagram illustrating yet another aspect of some embodiments of the present invention. Here, virtual reality navigation is invoked by raising the shoulders of user 900 possibly from position 920 to position 910 defining a displacement 930 that may be measured and translated into a corresponding navigation command in the virtual reality world. It is understood that such a gesture as described herein may require a remote camera 940 which is positioned at the scene, directed at user 900.

Figure 10:
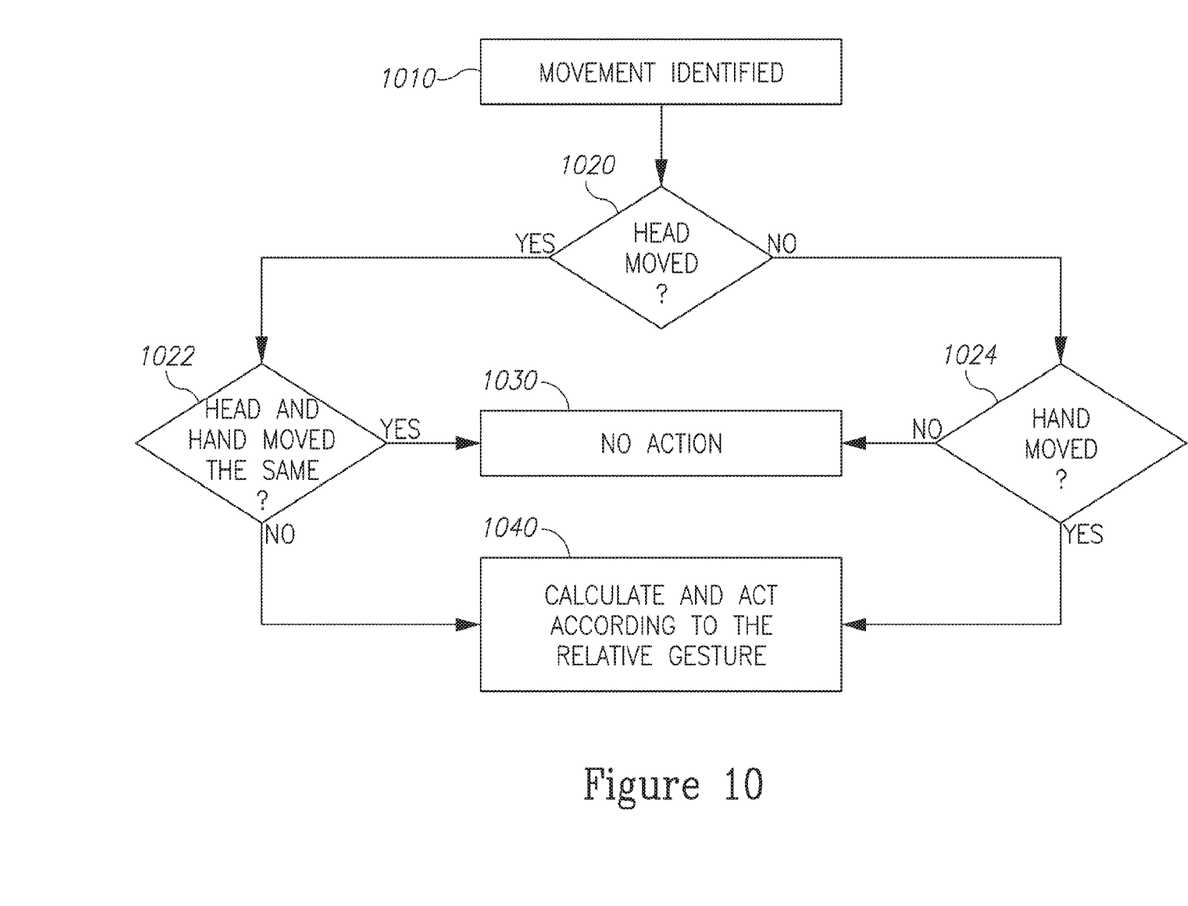
FIG. 10 is a flowchart diagram illustrating yet another aspect of a method according to some embodiments of the present invention.

FIG. 10 is a high level flowchart illustrating an aspect according to some embodiments of the present invention. One challenge of embodiments of the present invention is to differentiate between the change in gaze direction or the orientation of the head and a deliberate gesturing or posturing that affect the head position which should be interpreted as a VR navigation command. This differentiating can be carried out by subtracting form the overall bodily gesture what is perceived to be related to moving the head of the user for changing view point purposes only.

According to some embodiments of the present invention, analyzing reflections of the patterned light may include subtracting movement components affiliated with head movements of the user, to retrieve gestures of the body part, relative to the head of the user. The retrieved movements will be so-called "pure gestures" eliminating the undesirable head movements.

According to a possible non-limiting implementation, once a movement is identified based on the reflections 1010, the flow goes on to check whether the head of the user has moved 1020. In case it did, it is further checked whether the hand has moved in a similar manner 1022. In case the hand did, no action needs to be taken 1030. In case they moved differently, a subtraction of the head movement and the hand movement is carried out 1040. In a case that that the head did not move, a check whether the hand has moved is made 1024. In case the hand did not, no action is taken 1030. In case it did, a subtraction of the head movement and the hand movement is carried out 1040.

Figure 11:
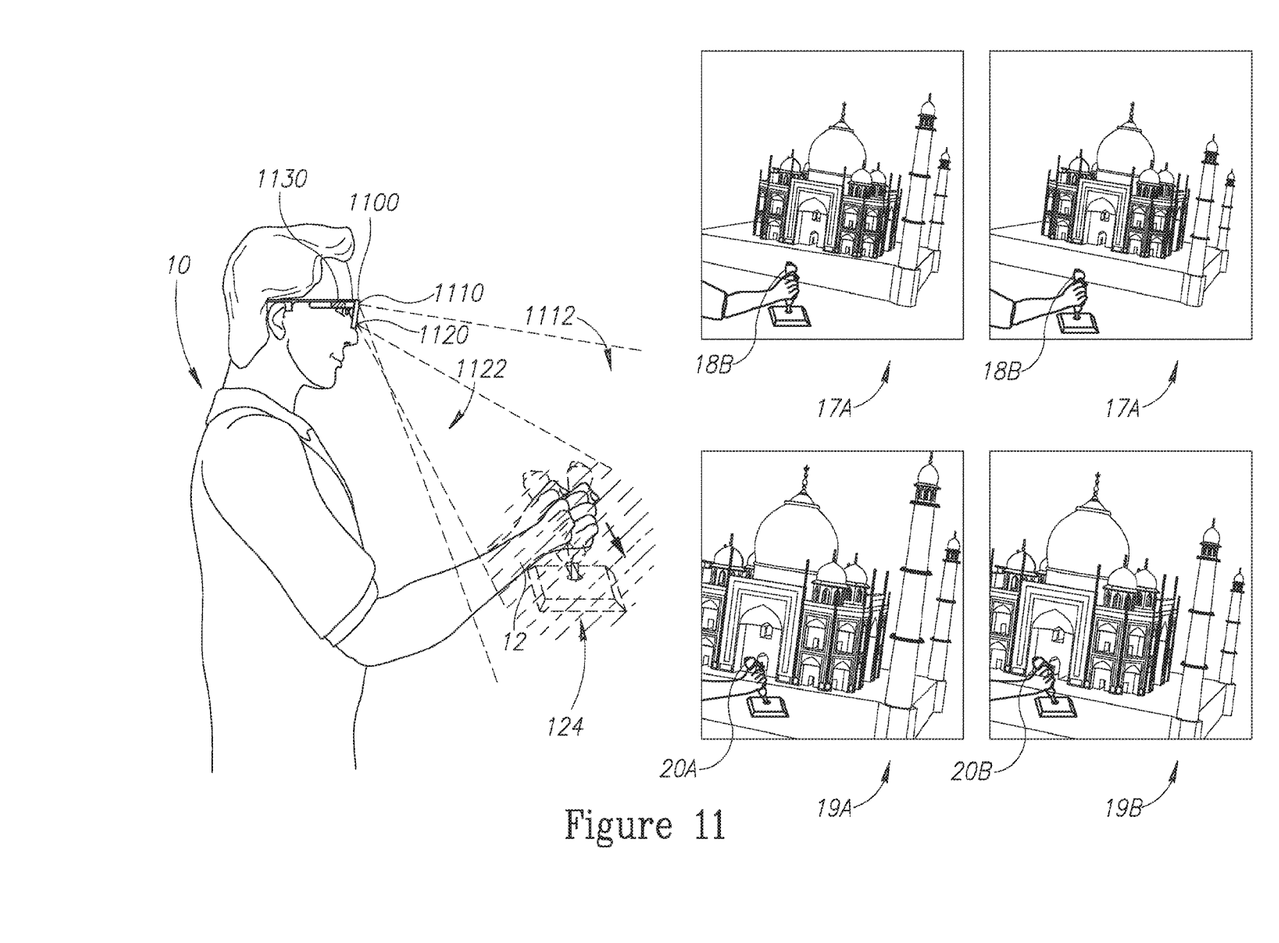
FIG. 11 is a diagram illustrating yet another aspect of some embodiments of the present invention.

FIG. 11 is a schematic diagram illustrating the system and the environment according to one embodiment of the present invention. User 10 wears a near eye display 1100 which further includes an illuminator 1120 and a capturing device 1110. In operation, near eye display 1100 is configured to project a synthetic scene onto both eyes of user 10. Illuminator 1120 may illuminate a vicinity of user 10 and/or user 10 himself or herself with patterned light 1122 reflections of the patterned light may be captured by capturing device 1110 and then analyzed by a computer processor 1130 within near eye display 1100, to yield position and orientation as changed in real-time. In a case that user 10 performs a predefined gesture, a virtual input device such as a joystick 18A/18B appear in image. User then can grab the virtual joystick in the virtual world and control it using gestures in the real world wherein the change of the orientation of the joystick is apparent in FIGS. 19A and 19B as seen at 20A/20B. It is important to note that no real joystick is involved here—but rather a completely virtual one that may be any input device being virtualized. The postures and gestures carried out by the user imitating gripping and controlling a joystick are at the focus of this embodiment enabling an intuitive body gesturing.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method comprising:
   displaying a synthetic 3D scene;
   identifying at least one gesture or posture carried out by at least one body part of the user;
   deriving a vector that spatially represents the identified gesture or posture;
   transforming the vector into a continuous movement or action in the synthetic 3D scene, based on at least one of an angle of the vector and a length of the vector, wherein a speed of the movement is based on a value of the angle; and
   modifying the synthetic 3D scene to reflect the movement or action in the synthetic 3D scene.

2. The method of claim 1, wherein the identifying the at least one gesture or posture comprises applying a classifier to a database of predefined postures and gestures.

3. The method of claim 1, wherein the movement or action in the synthetic 3D scene is carried out continuously as long as the at least one of the angle of the vector and the length of the vector maintains a value beyond a predefined threshold.

4. The method of claim 1, wherein the movement or action in the synthetic 3D scene is terminated responsive to detecting a predefined termination act.

5. The method of claim 1, wherein the movement or action in the synthetic 3D scene is terminated responsive to detecting a return of the at least one body part to a basic posture position.

6. The method of claim 1, wherein the identified posture is leaning forward a torso of the user or raising shoulders of the user.

7. The method of claim 1, wherein the identified posture is defined by a spatial relationship between at least two body parts of the user, and the method further comprises determining angles between the at least two body parts and transforming the determined angles into the continuous movement or action in the synthetic 3D scene.

8. The method of claim 1, wherein the vector associated with the identified gesture or posture further comprises a spatial direction angle.

9. The method of claim 1, wherein identifying the least one gesture or posture further comprises subtracting movement components affiliated with head movements of the user to retrieve postures and gestures of the at least one body part that are relative to the head of the user.

10. The method of claim 1, further comprising superimposing a virtual user-interface object into the synthetic 3D scene enabling the user to apply gestures and postures relative to the virtual user-interface object.

11. A system comprising:
    a device configured to display a synthetic 3D scene; and
    a computer processor configured to:
    identify at least one gesture or posture carried out by at least one body part of the user;
    derive a vector that spatially represents the identified gesture or posture;
    transform the vector into a continuous movement or action in the synthetic 3D scene, based on at least one of an angle of the vector and a length of the vector, wherein a speed of the movement is based on a value of the angle; and
    modify the synthetic 3D scene to reflect the movement or action in the synthetic 3D scene.

12. The system of claim 11, wherein the computer processor is further configured to apply a classifier to a database of predefined postures and gestures to identify the at least one gesture or posture.

13. The system of claim 11, wherein the computer processor is further configured to perform the movement or action in the synthetic 3D scene continuously as long as the at least one of the angle of the vector and the length of the vector maintains a value beyond a predefined threshold.

14. The system of claim 11, wherein the computer processor is further configured to terminate the movement or action in the synthetic 3D scene responsive to detection of a predefined termination act.

15. The system of claim 11, wherein the computer processor is further configured to terminate the movement or action in the synthetic 3D scene responsive to detecting a return of the at least one body part to a basic posture position.

16. The system of claim 11, wherein the identified posture is leaning forward a torso of the user or raising shoulders of the user.

17. The system of claim 11, wherein the identified posture is defined by a spatial relationship between at least two body parts of the user, and the computer processor is further configured to determine angles between the at least two body parts and transform the determined angles into the continuous movement or action in the synthetic 3D scene.

18. The system of claim 11, wherein the vector associated with the identified gesture or posture further comprises a spatial direction angle.

19. The system of claim 11, wherein the computer processor is further configured to subtract movement components affiliated with head movements of the user to retrieve postures and gestures of the at least one body part that are relative to the head of the user.

20. The system of claim 11, wherein the computer processor is further configured to superimpose a virtual user-interface object into the synthetic 3D scene enabling the user to apply gestures and postures relative to the virtual user-interface object.

\* \* \* \* \*

UNITED STATES PATENT AND TRADEMARK OFFICE
CERTIFICATE OF CORRECTION

PATENT NO. : 9,972,136 B2
APPLICATION NO. : 15/433952
DATED : May 15, 2018
INVENTOR(S) : Nadav Grossinger et al.

Page 1 of 1

It is certified that error appears in the above-identified patent and that said Letters Patent is hereby corrected as shown below:

In the Claims

Column 10, Line 6, after "identifying" delete "the" and insert -- at --.

Signed and Sealed this
Second Day of October, 2018

Andrei Iancu
*Director of the United States Patent and Trademark Office*